United States Patent [19]

Barlow et al.

[11] 4,072,853

[45] Feb. 7, 1978

[54] APPARATUS AND METHOD FOR STORING PARITY ENCODED DATA FROM A PLURALITY OF INPUT/OUTPUT SOURCES

[75] Inventors: George J. Barlow, Tewksbury; Chester M. Nibby, Jr., Peabody, both of Mass.

[73] Assignee: Honeywell Information Systems Inc., Waltham, Mass.

[21] Appl. No.: 727,821

[22] Filed: Sept. 29, 1976

[51] Int. Cl.[2] .................... G11C 29/00; G06F 11/12
[52] U.S. Cl. ................................................. 235/312
[58] Field of Search ............... 340/146.1 AL; 235/312

[56] References Cited

U.S. PATENT DOCUMENTS

| | | | |
|---|---|---|---|
| 3,766,521 | 10/1973 | Carter et al. | 235/153 AM |
| 3,814,921 | 6/1974 | Nibby et al. | 235/153 AM |
| 3,836,957 | 9/1974 | Duke et al. | 340/146.1 AL |
| 3,949,208 | 4/1976 | Carter | 235/153 AM |
| 4,005,405 | 1/1977 | West | 340/146.1 AL |

*Primary Examiner*—Charles E. Atkinson

*Attorney, Agent, or Firm*—Faith F. Driscoll; Nicholas Prasinos; Ronald T. Reiling

[57] ABSTRACT

Apparatus and method are included in the main memory of the data processing system which receives data from a plurality of input/output devices connected to a common bus. During a write cycle of operation, a device applies a plurality of data byte signals together with associated parity bits for writing into an addressed storage location of memory. Error detection and correction encoder circuits are connected to receive the data bits and parity bits and from them generate check code bits which are coded to signal selectively the presence of an uncorrectable error condition in accordance with the parity bits from a given source. During a read cycle of operation, error detection and correction decoder circuits connected to the memory in response to the data and check code bits read out from an addressed location are operative to generate a number of syndrome bits having a predetermined characteristic for indicating the existence of an uncorrectable error condition when the parity bits associated with data signals when written originally into memory if checked would have indicated that the data was in error.

27 Claims, 11 Drawing Figures

Fig. 4a.

| | *PDE | 0 | 1 | 2 | 3 | 4 | 5 | 6 | 7 | A | 8 | 9 | 10 | 11 | 12 | 13 | 14 | 15 | B |
|---|---|---|---|---|---|---|---|---|---|---|---|---|---|---|---|---|---|---|---|
| C0 | | | | | | | | | | | 1 | 1 | 1 | 1 | 1 | 1 | 1 | 1 | |
| C1 | | 1 | 1 | 1 | 1 | 1 | 1 | 1 | | | | | | | | | | | 1 |
| C2 | | | | 1 | 1 | 1 | 1 | | | | | | | | 1 | 1 | 1 | 1 | |
| C3 | | 1 | 1 | | 1 | | | 1 | 1 | 1 | | | 1 | 1 | | 1 | | | 1 |
| C4 | 1 | 1 | | 1 | | 1 | | 1 | 1 | | 1 | | 1 | | 1 | | 1 | | 1 |
| C5 | 1 | | 1 | 1 | | 1 | 1 | | 1 | | 1 | | 1 | 1 | | 1 | 1 | | |

BPS= BUS PARITY SUM
BPS=(WBPo ⊕ WBPi)

Fig. 4b.

| | *PDE | 0 | 1 | 2 | 3 | 4 | 5 | 6 | 7 | A | 8 | 9 | 10 | 11 | 12 | 13 | 14 | 15 | B | **BPE | C0 | C1 | C2 | C3 | C4 | C5 |
|---|---|---|---|---|---|---|---|---|---|---|---|---|---|---|---|---|---|---|---|---|---|---|---|---|---|---|
| S0 | | 1 | 1 | 1 | 1 | 1 | 1 | 1 | 1 | 1 | 1 | | | | | | 1 | 1 | | | | | | | | |
| S1 | | | | | | | | | 1 | 1 | 1 | 1 | 1 | 1 | 1 | 1 | 1 | 1 | | 1 | | | | | | |
| S2 | | | | 1 | 1 | 1 | 1 | | | | | | | | 1 | 1 | 1 | 1 | | | | 1 | | | | |
| S3 | | 1 | 1 | | 1 | | | 1 | 1 | 1 | | | 1 | 1 | | 1 | | | 1 | | | | 1 | | | |
| S4 | 1 | 1 | | 1 | | 1 | | 1 | 1 | | 1 | | 1 | | 1 | | 1 | | 1 | | | | | 1 | | |
| S5 | 1 | | 1 | 1 | | 1 | 1 | | 1 | | 1 | | 1 | 1 | | 1 | 1 | | | | | | | | 1 | |

**BPE= BUS PARITY ERROR
*PDE= PARTIAL WRITE DOUBLE ERROR

Fig. 4c.

| | 0 | 1 | 2 | 3 | 4 | 5 | 6 | 7 | A | 8 | 9 | 10 | 11 | 12 | 13 | 14 | 15 | B | C0 | C1 | C2 | C3 | C4 | C5 |
|---|---|---|---|---|---|---|---|---|---|---|---|---|---|---|---|---|---|---|---|---|---|---|---|---|
| S0 | 1 | 1 | 1 | 1 | 1 | 1 | 1 | 1 | 1 | 1 | | | | | | | 1 | | | | | | | |
| S1 | | | | | | | | 1 | 1 | 1 | 1 | 1 | 1 | 1 | 1 | 1 | 1 | | 1 | | | | | |
| S2 | | | 1 | 1 | 1 | 1 | | | | | | | 1 | 1 | 1 | 1 | | | | 1 | | | | |
| S3 | 1 | 1 | | 1 | | | 1 | 1 | 1 | | | 1 | 1 | | 1 | | | 1 | | | 1 | | | |
| S4 | 1 | | 1 | | 1 | | 1 | 1 | | 1 | | 1 | | 1 | | 1 | | 1 | | | | 1 | | |
| S5 | | 1 | 1 | | 1 | 1 | | 1 | | 1 | | 1 | 1 | | 1 | 1 | | | | | | | 1 | |

APPARATUS AND METHOD FOR STORING PARITY ENCODED DATA FROM A PLURALITY OF INPUT/OUTPUT SOURCES

BACKGROUND OF THE INVENTION

1. Field of Use

This invention relates generally to data processing systems and more particularly to error detection and correction apparatus included within the memory of a data processing system.

2. Prior Art

It is well known to utilize metal oxide semiconductor field effect transistor (MOSFET) memory elements in main memory systems. Since such memories are volatile in nature and require continual restoration of the stored information, error detection and correction apparatus are normally included within such memory systems for ensuring the integrity of the stored information. Generally, main storage systems utilize a modified Hamming code for single error detection/double error detection. Normally, such codes increase significantly the number of memory circuits.

In order to increase memory reliability notwithstanding attendant increases in error detection and correction circuits, at least one system utilizes codes which improve upon the modified Hamming SEC/DED codes and simplify the memory circuit implementation as well as provide faster and better error detection capability. This arrangement is described in a paper "A Class of Optimal Minimum Odd-Weight-Column SEC/DED Codes" by M. Y. Hsiao which appears in the publication "IBM Journal of Research and Development", July, 1970. The construction of such codes is described in terms of a parity check matrix H. The selection of the columns of the H matrix for a given ($n$, $k$) code is based upon the following constraints:

1. Every column should have an odd number one's;
2. The total number of one's in the H matrix should be a minimum; and,
3. The number of one's in each row of the H matrix should be made equal or as close as possible to the average number.

Errors are indicated by analyzing the syndromes formed from the data amd check code bits. An odd number of syndrome bits indicates a single error while an even number of syndrome bits indicate a double or uncorrectable error.

In general, operations for decoding or encoding data and check bits in prior art memory systems proceed as follows. Normally, during a read operation, a word is read from a main memory location and the data bits together with check code bits are stored in a data storage register. Byte parity bits are generated from the data bits. The syndromes formed from the data and code check bits are analyzed. If no error is indicated, the byte parity encoded data is transmitted onto the data bus. If a double code error is indicated, a program interrupt signal is generated and the error data are made available for program analysis. In the case where a single error is signalled, the correction circuits correct the data.

In the case of a write operation, the byte encoded parity word is received from the data bus and the check code bits are generated for the SEC/DED code. The received byte parity bits are examined for validity. When no error is detected, the coded word is stored into a memory location. In the event of a double error, the write operation is aborted and the data processing system is notified of the error.

Additionally, such prior art memory systems are required to perform "partial write" operations. The partial write operation occurs when a portion of data word (i.e., a byte) stored in memory is read out and altered by new data and thereafter written into memory. Prior art memory systems handle partial write operations similar to that described above. That is, the data to be written into memory is checked. When a double error is indicated, the operation is aborted and the data processing system is notified.

The above arrangements have been found to be unsuitable for use in systems where data is transferred along a common data bus at a rapid rate. In such instances, by the time the parity encoded data word can be checked, the data source applying the data will have relinquished its control of the bus. Accordingly, the arrangement requires that the sending source be connected to the bus until the parity encoded data can be checked. This results in reducing the overall throughput of the data processing system.

Also, at least one of the above mentioned prior art systems has employed an arrangement which utilizes address parity bits as data bits and includes such bits in the generation of check code bits. While the arrangement is able to signal when an incorrect location is being accessed, the address parity bits provide no indication regarding the integrity of the data being written into memory.

Accordingly, it is a primary object of the present invention to provide an improved method and apparatus for detecting and correcting parity encoded data applied from any one of a plurality of input/output sources for storage in a memory system.

It is another object of the present invention to provide an improved method and apparatus for use in a memory system connected to operate with a high speed common bus system.

It is still a further object of the present invention to provide an arrangement for detecting and correcting errors in a manner which requires a minimum of additional circuits.

SUMMARY OF THE INVENTION

The above and other objects are achieved in a preferred embodiment of the present invention which includes encoder circuits which couple to the input circuits of a memory system and decoder circuits which couple to the output circuits of the memory system. The decoder circuits connect to error correction circuits which transmit to the bus and the encoder circuits are connected to receive from the bus data bit signals and parity bit signals by any one of input/output devices. During a write memory cycle of operation, the encoder circuits generate a predetermined number of coded check bits from the unchecked data signals and associated parity bits received from any one of the devices. Thereafer, the data signals and generated check code bits are written into memory. The encoder circuits are operative to force selectively the check code bits to predetermined states when the parity bits of the unchecked data indicate that such data is an error.

During a subsequent read cycle of operation, the decoder circuits are conditioned by the check code bits to generate selectively syndrome bits having a first predetermined characteristic for signalling that the data was in error when it was initially written into memory.

In the preferred embodiment of the present invention, the characteristic is that the syndrome bits contain an even number of binary ONES indicative of an uncorrectable error condition. In the case where the input data has correct parity, the decoder circuits generate syndrome bits having the first predetermined characteristic only when a double error occurs as a consequence of a failure or fault within the memory system or its associated circuits. In all other instances, the decoder circuits generate syndrome bits having a second predetermined characteristic. In the preferred embodiment, the second predetermined characteristic corresponds to the syndrome bits having an odd number of binary ONES indicative of a single error condition. In response to such single bit error conditions, the correction circuits correct the condition automatically and produce parity bits from the data and check code bits which are thereafter applied to the bus together with the data bits.

In the case of a "partial write" operation, when the double error condition is detected by the decoder circuits during the read portion of the operation, the error conditions the encoder circuits to force the check code bits to a predetermined state. That is, the check code bits are forced to a predetermined state which condition the decoding circuits during a subsequent read cycle to generate syndrome bits having the first predetermined characteristic.

From the above, it is seen that the arrangement of the present invention is able to atomatically signal the occurrence of errors related to the correctness of unchecked data written into memory. Since it is essential that such errors not be corrected, they produce uncorrectable error indications. By eliminating the need to provide circuits for checking data before it is written into memory, the present invention reduces the amount of additional circuits. It also eliminates the need to include parity bits in memory.

More importantly, the present invention enables data transfers to take place at a maximum rate in that the invention eliminates the necessity for requiring checking of the parity encoded data words before being written into memory.

Additionally, the arrangement of the present invention facilitates the detection of catastrophic failures (i.e., inoperative memory) by ensuring that an uncorrectable error condition is signalled in such instances. That is, by selecting a particular group of outputs from the encoder, this causes the data signals written into memory containing all ONES or all ZEROS not to have check bits containing all ONES or all ZEROS notwithstanding same being inverted or complemented when subsequently read from memory.

The novel features which are believed to be characteristic of the invention both as to its organization and method of operation, together with further objects and advantages will be better understood from the following description when considered in connection with the accompanying drawings. It is to be expressly understood, however, that each of the drawings is given for the purpose of illustration and description only and is not intended as a definition of the limits of the present invention.

BRIEF DESCRIPTION OF THE DRAWINGS

FIGS. 4a through 4e illustrate matrices in accordance with the present invention.

DESCRIPTION OF THE PREFERRED EMBODIMENT

Figure 1:
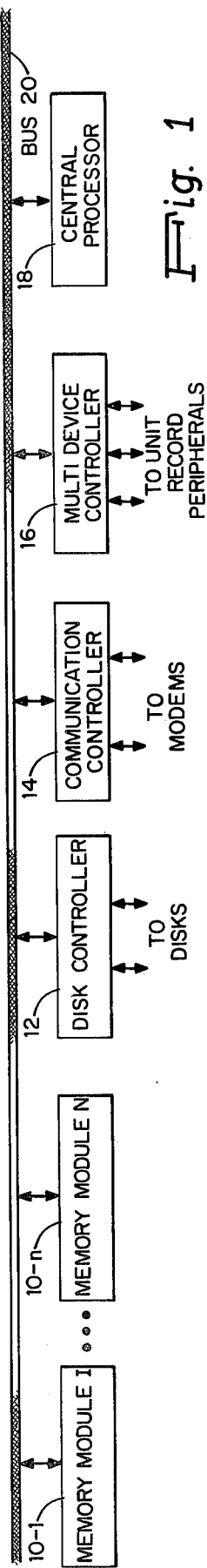
FIG. 1 is a block diagram of a system which incorporates the principles of the present invention.

FIG. 1 illustrates in block diagram form a data processing system which incorporates the teachings of the present invention. It is seen that the system includes a main memory which comprises a plurality of memory subsystems 10-1 through 10-n, a disc controller 12, a communication controller 14, a multidevice controller 16 and central processor 18 all of which connect to a common bus 20.

The bus arrangement enables any two units to communicate with each other at a given time interval over a common signal path provided by bus 20. Briefly, any unit wishing to communicate, requests a bus cycle. When the cycle is granted to the particular requesting unit, it is accorded the role of "master" and can address any other unit in the system as a slave unit. In those instances in which a response is required (i.e., read operations), the requesting unit signals the slave unit that a response (i.e., acknowledge) is required and identifies itself to the slave unit. The master unit applies the information to the bus and the slave unit (i.e., memory) sends an acknowledge signal and initiates a memory cycle of operation. At the time of acknowledgement, the master unit releases itself from the bus.

The bus 20 includes 24 address lines, 18 data lines, 6 control lines and 5 integrity lines. Certain ones of these lines will be discussed in greater detail in connection with FIG. 2. However, for detailed information regarding the operation of the system of FIG. 1 and bus 20, reference may be made to the copending patent application "Data Processing System Providing Split Bus Cycle Operation" invented by Frank V. Cassarino, et al. bearing Ser. No. 591,965, filed on June 30, 1975 and assigned to the same assignee as named herein.

Figure 2:
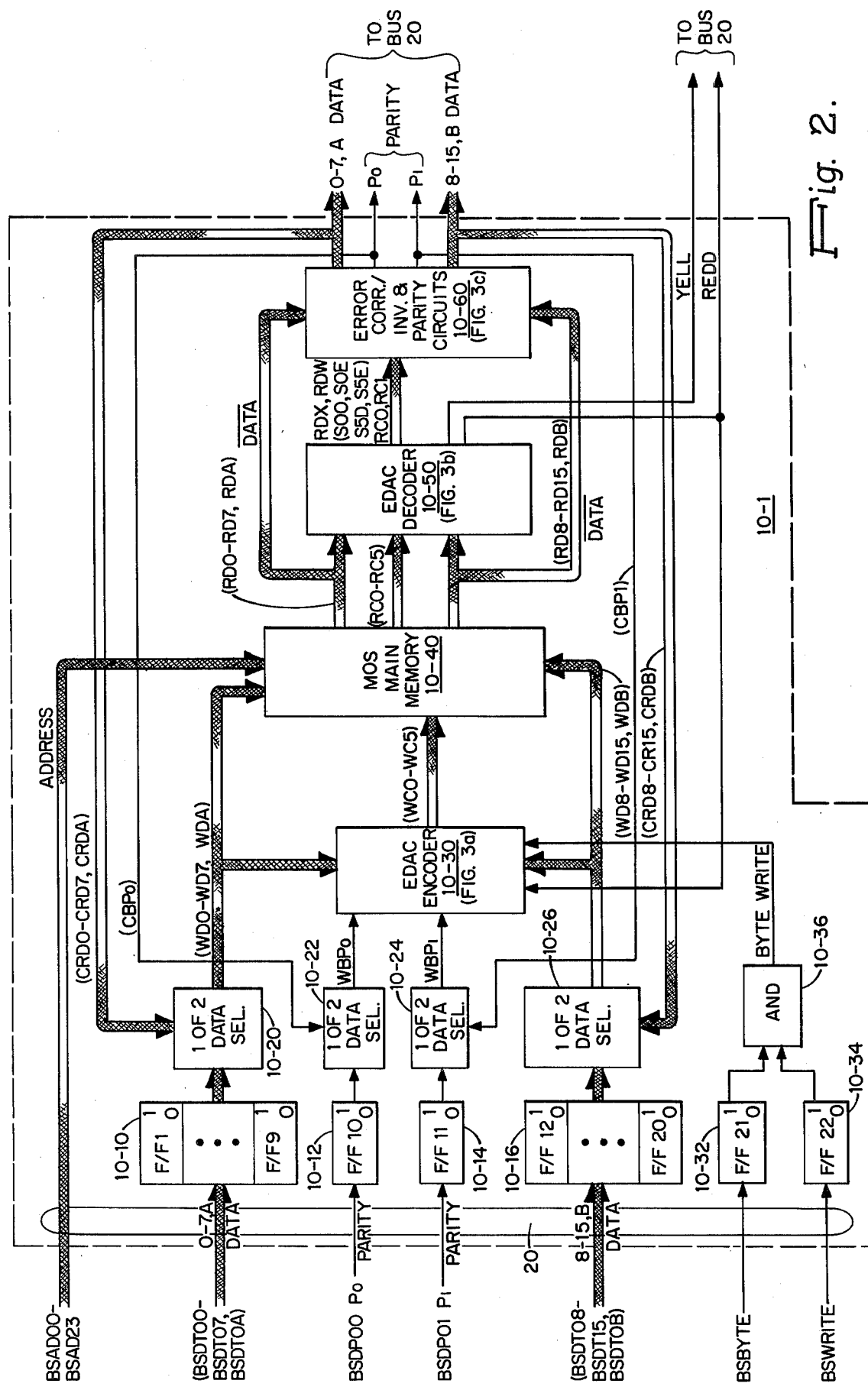
FIG. 2 illustrates in block diagram form one of the memory subsystems of the main memory system of FIG. 1.

Referring now to FIG. 2, it is seen that each memory subsystem in accordance with the present invention includes a MOS memory 10-40 which for the purposes of the present invention can be considered conventional in design. For example, the memory 10-40 can be constructed with the memory circuits disclosed in U.S. Pat. No. 3,786,437 invented by Brian F. Croxon, et al. which issued Jan. 15, 1974.

The memory subsystem 10-1 further includes a plurality of input flip-flops 10-10 through 10-34, a plurality of selector circuits 10-20 through 10-26, an EDAC encoder circuit 10-30, an EDAC decoder circuit 10-50 and error correction, inverter and parity circuits. The plurality of input flip-flops of blocks 10-10 through 10-34 are connected to receive corresponding ones of the signals from bus 20. That is, flip-flops 1 through 9 of block 10-10 receive signals BSDT00-BSDT07, BSDT0A of a first or left hand byte which correspond to data bits 0-7 and A of the bus 20. Flip-flop 10 of block 10-12 receives a parity signal BSDP00 which contains odd parity for bits 0-7 and A. Flip-flop 11 of block 10-14 receives a parity signal BSDE01 which contains odd parity for data bits 8–15, B of a second or right hand byte.

The flip-flops 10–20 of block 10–16 receive the data bits 8–15, B of the second byte from bus 20. Further, flip-flops 21 and 22 receive byte and write control signals BSBYTE and BSWRIT during a write operation. The byte signal BSBYTE indicates whether the transfer is a byte or word transfer. When a binary ONE, it indicates that the current transfer is a byte transfer. The signal BSWRIT indicates the direction of transfer. When a binary ONE, it indicates that the transfer is from the master unit to the slave unit. The binary ONE outputs of flip-flops 21 and 22 representative of stored states of the byte and write control signals are combined in an AND gate 10-36 to produce a BYTE WRITE signal. When the BYTE WRITE signal is forced to a binary ONE, this signals the memory subsystem that it is to perform a partial write operation as explained herein.

The signals BSAD00 through BSAD23 are memory address signals which are applied to the input address circuits (not shown) of memory 10-40. Each 24 bit address includes 8 memory module select bits, 15 internal address bits and a byte designator bit and designates a word storage location in memory 10-40.

As seen from FIG. 2 it is seen that the output signals of flip-flops 1–20 are applied as one input of corresponding ones of the plurality of one of two data selector circuits 10-20, 10-22, 10-24 and 10-26. The second input to each of the data selector circuits is from the output of the error correction, inverter and parity circuits of block 10-60. The signals CRD0-CRD7, CRDA, CRD8-CRD15, CRDB, CRP0 and CRP1 are selected from the second input for application to memory 10-40 and EDAC encoder circuit 10-30 during the read portion of a partial write cycle as explained herein.

The output signals WD0-WD7, WDA selected from either flip-flops 1–9 or inverter circuits of block 1-60 by data selector circuit 10-20 are applied to the EDAC encoder circuit 10-30 and to the write circuits (not shown) of memory 10-40 as shown. In accordance with the present invention, the parity signals WBP0 and WBP1, selected from either flip-flops 10 and 11 or the circuits of block 10-60, are applied as inputs to EDAC encoder 10-30. Further, the byte signals WD8-WD15, WDB from either flip-flops 12-20 or circuits 10-60 are applied as inputs to EDAC encoder 10-30 and memory 10-40.

As explained herein, the EDAC encoder 10-30 generates from the byte data signals WD0–WD15, WDA, WDB and parity signals WBP0, WBP1, check code bit signals WC0-WC5. The check code signals together with the byte data signals associated therewith are stored in memory 10-40. It will be appreciated that the data and check bit signals RD0–RD15, RDA, RDB, RC0–RC5, when read out from MOS memory 10-40 into a data out register (not shown), are inverted or complemented. As seen from FIG. 2, the inverted bit signals are applied to EDAC decoder 10-50 and the circuits 10-60.

The EDAC decoder 10-50 produces six pairs of complementary syndrome bit signals S00, S0E through S50, S5E in addition to two error indicator signals YELL and REDD. The signal YELL when a binary ONE indicates the detection of a single error and that correction of the error was made. The signal REDD indicates the detection of a double bit error, a bus parity error or a byte write error as explained herein.

The EDAC decoder circuit 10-50 applies the pairs of syndrome signals and pairs of check bit and data bit signals RC0, RC1, and RDX and RDY to the circuits 10–60. As explained herein, the circuits 10–60 provide corrected signals CRD0-CRD7, CRDA, CRD8-CRD15, CRDB to bus 20 and to data selector circuits 10-20 and 10-26 as mentioned previously. Also, the circuits 10-60 produce the parity signals CBP0 and CBP1 which are also applied to bus 20 and data selector circuits 10-22 and 10-24.

The data selector circuits discussed above can for the purpose of the present invention may be considered conventional in design. The EDAC encoder circuit 10-30, the EDAC decoder circuit 10-50, and the circuits 10-60 are shown in greater detail in FIGS. 3a through 3c respectively.

Figure 3A:
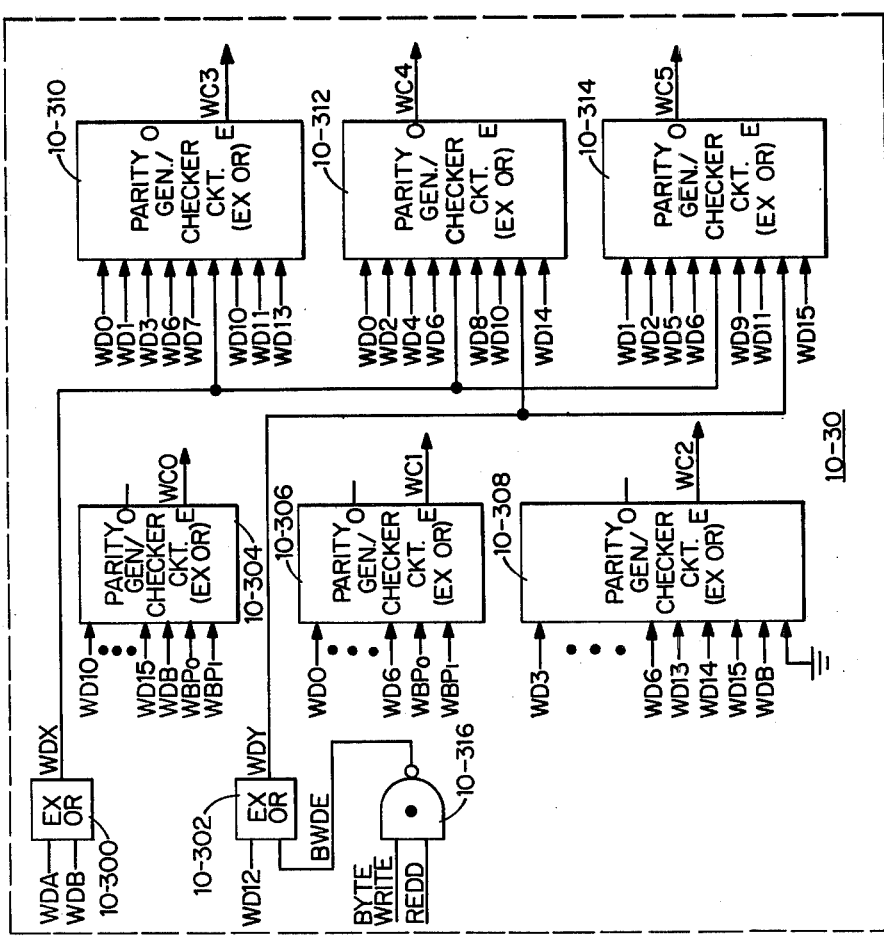
FIGS. 3a through 3c illustrate in greater detail portions of FIG. 2 in accordance with the present invention.

Referring first to FIG. 3a, it is seen that the EDAC encoder circuit 10-30 comprises a plurality of exclusive OR circuits 10-300 through 10-314 and a NAND gate 10-316 connected as shown. The six exclusive OR circuits 10-304 through 10-314 combine different ones of the data signals and parity signals to generate the check code signals WC0 WC5. The exclusive OR circuit 10-300 sums the expansion data bits while the circuit 10-302 sums the parity byte write error signa and data bit 12.

The combinations of signals to be summed are selected in accordance with the matrix of FIG. 4a. The matrix illustrates the generation of each of the check code bit signals WC0 through WC5. It will be noted that the matrix includes columns representing states of the data bits 0–7, A and 8–15, B. Data bits A and B are additional bit positions to be used for expansion. A column labeled PDE is used to represent the occurrence of a partial write double error condition which is signaled by the state of signal REDD as explained herein. The column labeled BPS represents the sum of the bus parity bit signals WBP0 and WBP1.

In each instance, a check code bit is generated by the exclusive OR of all of the columns which contain binary ONES (odd and even). For example, check code bit WC0 = 10 $\oplus$ 11 $\oplus$ 12 $\oplus$ 13 $\oplus$ 14 $\oplus$ 15 $\oplus$ B $\oplus$ BPS where BPS = WBP0 $\oplus$ WBP1.

To provide the summing operation indicated for generating each check code bit, each of the circuits 10-304 through 10-314 employs a parity generator/checker circuit which can be considered conventional in design. For example, such circuits may be constructed utilizing a 9 bit parity generator/checker circuit designated 82S62 manufactured by Signetics Corporation. The even output terminal designated E and odd output terminal are in turn applied as nputs to memory 10-40.

Normally, the inputs to each of the exclusive OR circuits are binary ZEROS which corresponds to ZERO volts. When the inputs are switched on or forced to a binary ONE, they assume a positive voltage value. By contrast, the signal BWDE from NAND gate 10-316 is normally a binary ONE (positive voltage value). The reason is that both signals BYTE WRITE and REDD are normally binary ZEROS (i.e., no error and not a partial write operation).

It will be noted that the matrix of FIG. 4a is a simplified version of the matrix of FIG. 4b. The matrix of FIG. 4b represents a modified version of the so-called H matrix for generating the check code bits for the two byte, 18 bit, data word in accordance with the present invention. The basic matrix is expanded to include a PDE column for designating a partial write double error condition and a BPE column for designating a bus parity error.

In accordance with the present invention, it will be noted that the occurence of either a bus parity error or a partial write double error results in causing the decoder circuit 10-50 to generate syndrome bits having an even number of binary ONES as explained herein. This results from including an even number of binary ONES in the PDE and PBS columns which relate to an even number of check code bits.

The matrix of FIG. 4b has been simplified so as to reduce the number of circuits required for generating the check code bits. That is, the rows C0 and C1 in the basic H matrix have been modified so that they require fewer number of binary ONES.

It is seen that in FIG. 4b, $C0 = 0 \oplus 1 \oplus 2 \ldots \oplus 7 \oplus 8 \oplus 9 \oplus A \oplus BPE$. Substituting into the previous expression, the appropriate value for BPE (i.e., $0 \oplus 1 \oplus \ldots 15 \oplus B \oplus P1$), $C0 = 10 \oplus 11 \oplus \ldots \oplus 15 \oplus B \oplus P0 \oplus P1$. By having $BPS = P0 \oplus P1$; $C0 = 10 \oplus 11 \oplus \ldots 15 \oplus B \oplus BPS$. Similarly, it can be shown that $C1 = 0 \oplus 1 \oplus 2 \ldots \oplus 6 \oplus BPS$.

By appropriate selection of encoder signals, certain check code patterns are not produced for the all ZEROS and all ONES data signals. As seen from FIG. 4d, that all ZERO and all ONES data signals produce check code bits which do not have all ONES or all ZEROS. This ensures that when there is a catastrophic memory failure rendering the memory inoperative that the check bit signals enable the detection of the failure. That is, such failures could give rise to an all ZEROS or all ONES pattern of data and check bit signals. Therefore, the failure could go undetected.

Figure 3B:
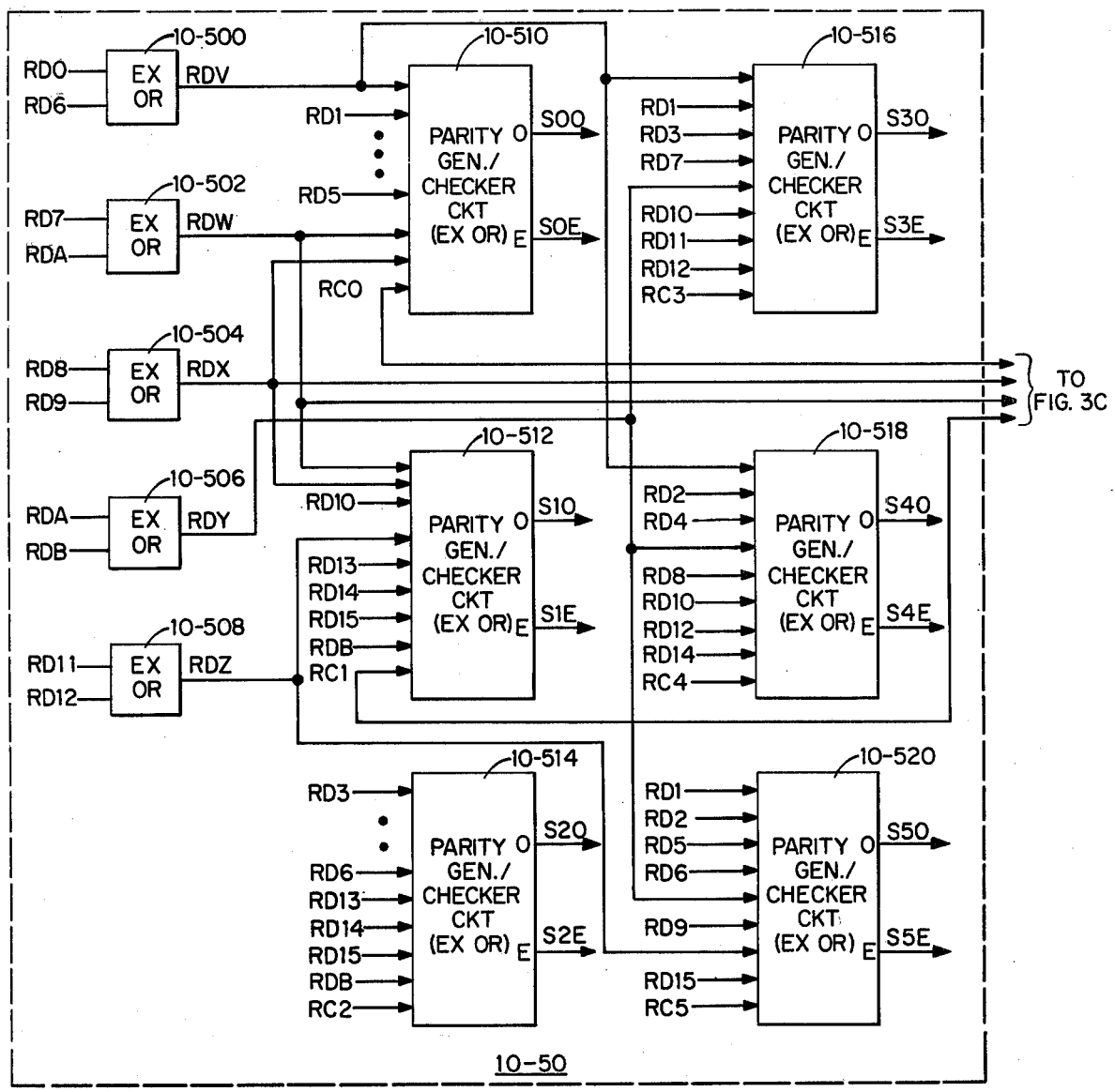

The decoder circuit 10-50 is shown in detail in FIG. 3b. The circuit 10-50 is constructed in accordance with the parity check matrix of FIG. 4c. It should be noted that this matrix does not include PDE or PBE columns. The reason is that the errors designated by these columns have been incorporated into the generation of check code bits by encoder circuit 10-30 and produce syndrome bits which include an even number of binary ONES upon the occurrence of such errors as mentioned previously.

Referring to FIG. 3b, it is seen that the decoder circuit 10-50 includes a plurality of exclusive OR circuits 10-500 through 10-520 arranged as shown. Similar to encoder circuit 10-30, the summing of the different binary ONE columns of the matrix of FIG. 4c required for the generation of syndrome bits S0 through S5 is also accomplished by means of parity generator/checker circuits. As indicated by FIG. 4c, S0 and S1 require summation of 12 column signals, and S3, S4 and S5 require summation of 11 column signals. Certain data bits (i.e., RD0, RD6 through RD11, RD12) are summed by exclusive OR circuits 10-500 through 10-508.

Since syndrome bits S0 and S1 are produced from an even number of column signals and syndrome bits S2–S5 are produced from an odd number of column signals, both the even and odd output terminals of circuits 10-510 through 10-520 are utilized as explained herein. As mentioned previously, the signals read out of memory 10-40 are complemented. Accordingly, the input signals to each of the exclusive OR circuits are normally in a binary ONE state (i.e., positive voltage level). This means that the output signals RDV, RDW, RDY and RDZ are also in a binary ZERO state. Also, the even output terminal, designated E of each of the circuits 10-510 and 10-512 are normally binary ONES while the same terminal of each of the circuits 10-514, 10-516, 10-518 and 10-520 are normally binary ZEROS. The odd output terminals, designated 0, of each of the circuits 10-510 through 10-520 are in a state which is complementary to the even output terminal associated therewith.

Figure 3C:
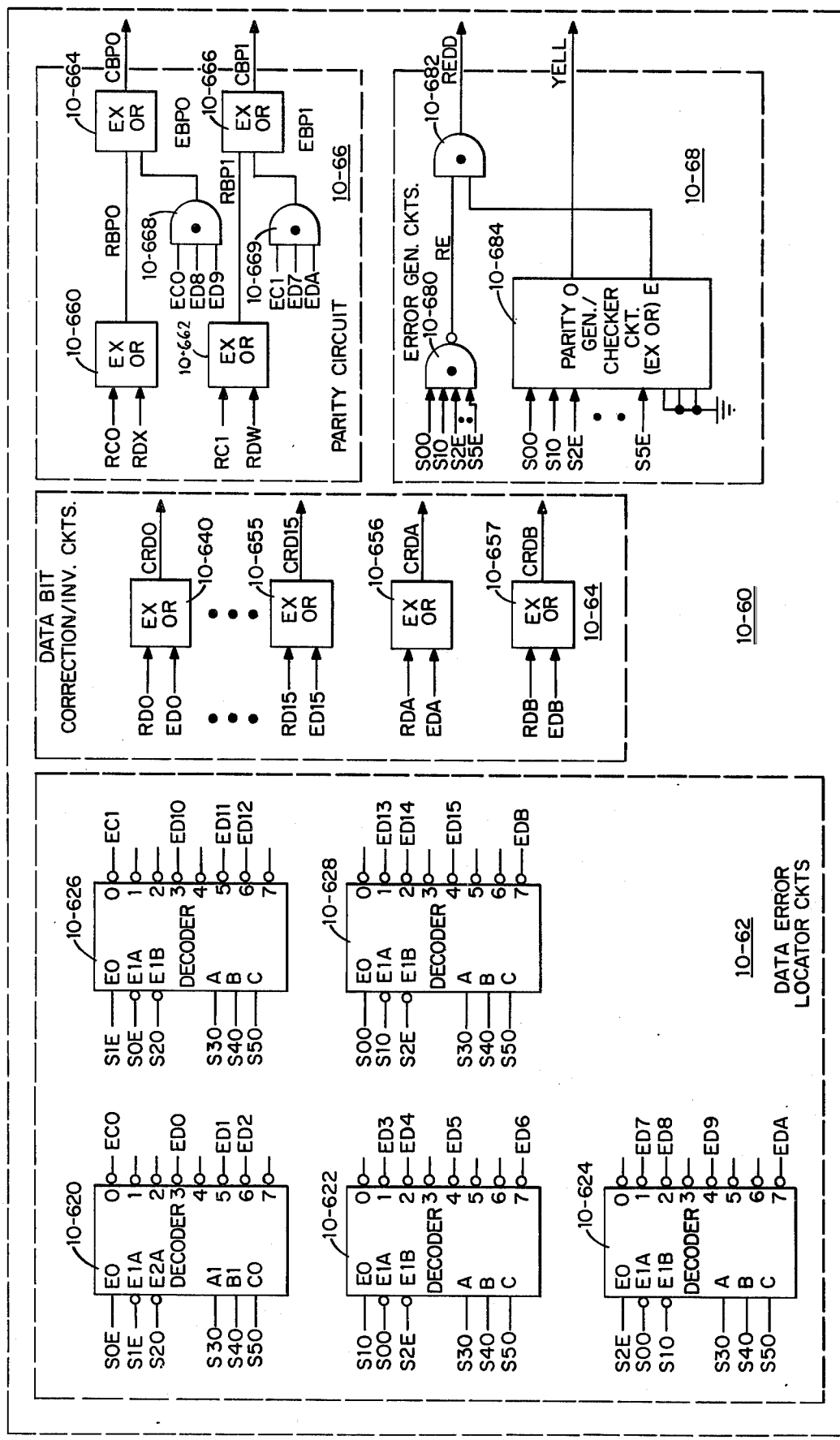

FIG. 3c illustrates the circuits of block 10-60 which locate and correct single bit errors in addition to producing byte parity signals and error signals. As seen from the Figure, the block 10-60 includes a plurality of error location circuits 10-62, a plurality of correction circuits 10-64, a parity circuit 10-66 and a plurality of error generation circuits 10-68 arranged as shown.

The circuits 10-62 designate the particular bit which requires correction in the case of a single bit error. The circuits 10-62 include a plurality of decoder circuits 10-620 through 10-628 each of which receive different combinations of syndrome bit signals. The decoder circuits may be considered conventional in design. For example, they may employ circuits such as an SN74S138 manufactured by Texas Instruments Inc.

As seen from FIG. 3c, each decoder circuit has three enable input terminals and three binary select input terminals. The syndrome signals applied to the enable input terminals in the case of an error select one of the five decoder circuits while the syndrome signals applied to the select input terminals select the particular bit to be corrected. For example, where syndrome bits S0–S5 have a value 011010, results in the selection of decoder circuit 10-628 and in the forcing of signal ED14 from a binary ONE to a binary ZERO (i.e., from a positive voltage level to a zero voltage level).

A different one of the output signals EC0 through EDB from the circuits 10-62 is applied as one input of a particular one of the plurality of exclusive OR circuits 10-640 through 10-657 of the data bit correction circuits 10-64. Each exclusive OR circuit both corrects and inverts the state of the data bit signal applied as a second input thereto. More specifically, normally the signals applied to each exclusive OR circuit is a binary ONE placing the output terminal of each circuit at a binary ZERO. When no correction is designated, the decoder signal (e.g., signal ED4) remains a binary ONE. Therefore, the signal present at the output terminal of the exclusive OR circuit is the complement or inverse of the input data signal (e.g., signal CRD4 = $\overline{RD4}$). When correction is required, the decoder signal is forced to a binary ZERO state. Therefore, the signal present at the output terminal of the exclusive OR circuit is the same as the input data signal (e.g., signal CRD4 = RD4).

For further information regarding the operation of the circuits 10-62 and 10-60, reference may be made to the copending patent application "Error Locator Circuits" invented by Chester M. Nibby, Jr., et al. bearing Ser. No. 727,820 filed on even date herewith and assigned to the same assignee as named herein.

As seen from FIG. 3c, the parity circuit 10-66 includes exclusive OR circuits 10-660 through 10-666 and a pair of AND gates 10-668 and 10-669 arranged as shown. Parity bit CBP0 represents odd parity for bits 0–7 and A while parity bit CBP1 represents odd parity for bits 8–15 and B.

The above can be seen from FIGS. 4a and 4b. C0 (encoder) $= 10 \oplus 11 \oplus 12 \oplus 13 \oplus 14 \oplus 15 \oplus B \oplus BPS$ where $BPS = 0 \oplus 1 \oplus 2 \ldots \oplus 7 \oplus A \oplus 8 \oplus 9 \ldots \oplus 15 \oplus B$. Substituting the value for BPS into the expression for C0 results in the following $C0 = 0 \oplus 1 \oplus 2 \ldots \oplus A \oplus 8 \oplus 9$. By applying signal RDX to exclusive OR circuit 10-660, this effectively cancels out bits 8 and 9 (i.e., RDX = RD8 ⊕ RD9). Thus, signal CBP0 = 0 ⊕ 1 ⊕ 2 ... 7 ⊕ A and represents odd parity for bits 0-7 and A. The same is true for C1.

In FIG. 3c, normally RC0 is a binary ONE and signal RBP0 is also a binary ONE. When data bit signals RD8 and RD9 are equal, RDX is a binary ZERO. Signal RBP0 assumes the same state as signal RC0. When signals RD8 and RD9 are unequal, RDX is a binary ONE. Signal RBP0 is the complement of the state of signal RC0.

In the case of no correction, signal EBP0 is normally a binary ONE which means that signals EC0, ED8 and ED9 are normally binary ONES. Therefore, signal CBP0 corresponds to the complement of signal RBP0. In the case of a correction when signal EBP0 is forced to a binary ZERO, signal CBP0 assumes the same state as signal RBP0. The circuits 10-662 through 10-666 operate in a similar fashion to produce signal CBP1.

The last group of circuits in FIG. 3c generates error signals REDD and YELL. The circuits include a NAND gate 10-680, an AND gate 10-682 and an exclusive OR circuit 10-684 arranged as shown. The signal YELL signals the system of FIG. 1 when the memory subsystem 10-1 detected a single bit error in a data word which it corrected. The signal REDD signals the system when the memory subsystem 10-1 detected an uncorrectable error which includes a double bit error, a bus parity error or a partial write error.

When there is no error, syndrome signals S00 through S5E are normally all binary ONES. This causes signal RE to be a binary ZERO which causes signal REDD to be a binary ZERO. The circuit 10-684 in this case forces its odd output terminal to a binary ZERO and its even output terminal to a binary ONE.

In the case of a correctable error where there is an odd number of syndrome bits, circuit 10-684 forces its odd terminal to a binary ONE and its even terminal to a binary ZERO. Hence, signal REDD remains a binary ZERO. Thus, the state of signal RE does not matter in this case.

When there is uncorrectable error where there is an even number of syndrome bits, two or more of the syndrome signals S00-S5E are binary ZEROS. This forces signal RE to a binary ONE. The circuit 10-684 forces its even output terminal to a binary ONE and its odd output terminal to a binary ZERO. This causes AND gate 10-682 to force signal REDD to a binary ONE.

DESCRIPTION OF OPERATION

Figure 4D:
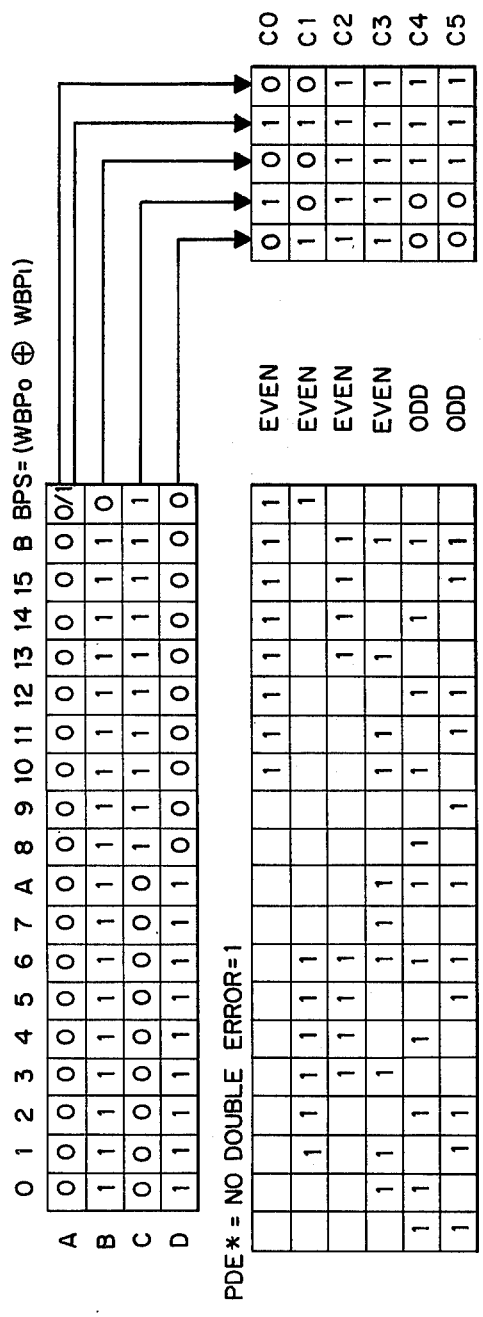
Figure 4E:
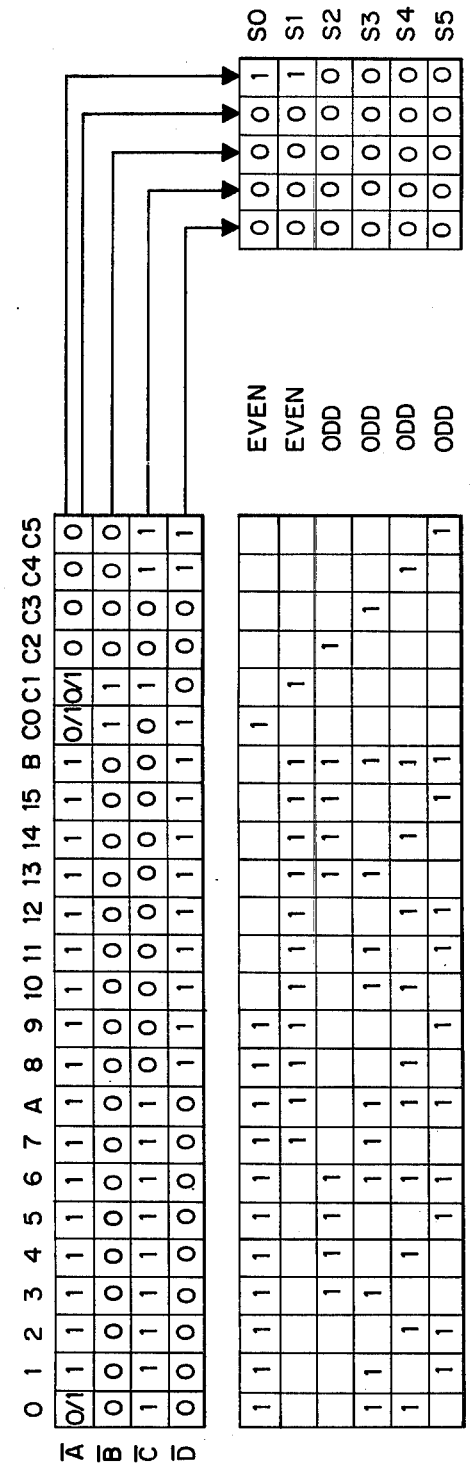
Figure 5:
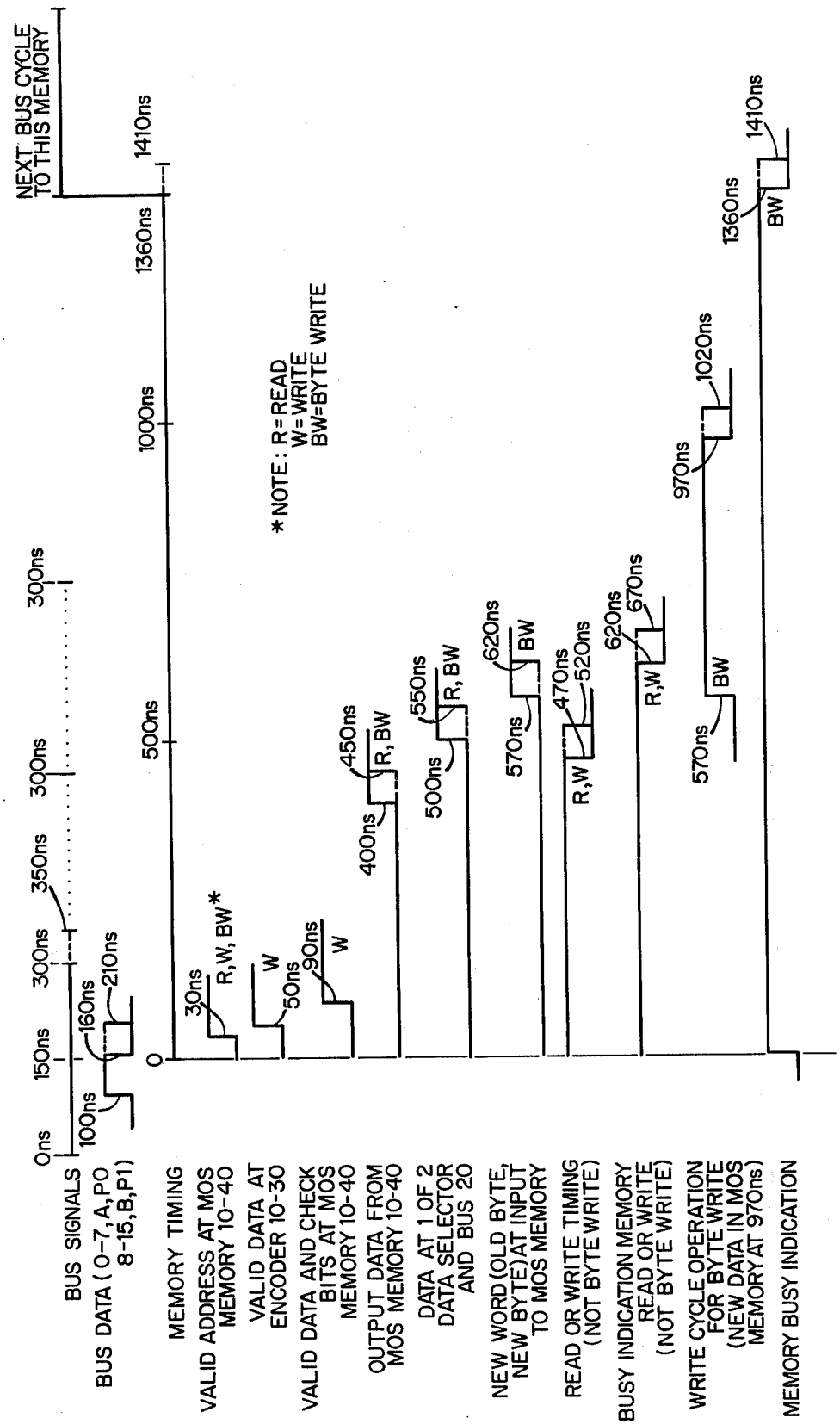
FIG. 5 is a memory timing diagram used in explaining the operation of the present invention.

With reference to FIGS. 1-3c and FIGS. 4a-4e and 5, the operation of the apparatus of the preferred embodiment will now be described. Referring first to FIG. 5, it is seen that the bus cycle is 300 nanoseconds in duration. Data is available from a device for an interval of 60 nanoseconds starting at 100 nanoseconds from the start of the cycle as shown in FIG. 5.

When the memory subsystem 10-1 is addressed and it is not busy, a memory cycle of operation is begun. At this time, the bus has completed 150 nanoseconds of its cycle. After 30 nanoseconds from the start of the memory cycle, valid memory address signals BSAD00-BSAD23 appear at the address circuits of memory 10-40. During a write cycle, the data signals are available at encoder circuit 10-30, 50 nanoseconds from the start of the memory cycle. At 90 nanoseconds, valid data with check code bits are available for writing into memory 10-40.

As seen from FIG. 5, data signals appear at the output of memory 10-40, 400 nanoseconds from the start of the memory cycle. After an interval of 100 nanoseconds, the corrected data is applied to the data selector circuits and bus 20. During a write cycle of operation, data is written into memory 10-40 within 470 nanoseconds and the memory subsystem 10-1 is again available after 620 nanoseconds.

In the case of a byte write operation, the new data bit signals together with check bits are present at the input circuits of memory 10-40, 570 nanoseconds from the start of the memory cycle. A write cycle is begun at 570 nanoseconds and the new data will have been written into memory 10-40 by 970 nanoseconds from the start of a memory cycle. The memory is available for operation, 1360 nanoseconds from the start of the cycle. The additional delay ensures proper operation of the MOS memory.

It should be noted that if it was necessary to check the parity of the data signals applied to the memory subsystem 10-1, it would require increasing the bus cycle by 50 nanoseconds. The reason is that the memory subsystem would have to make the check and acknowledge this via bus 20. The increase in the bus cycle is illustrated by dotted lines in FIG. 5.

An example illustrating the operation of memory subsystem 10-1 in accordance with the present invention will now be discussed with reference to FIGS. 4d and 4e. It is assumed that one of the devices of FIG. 1 applies words A, B, C and D in succession to memory subsystem 10-1 for writing into four successive memory locations during four successive bus cycles. In the first case, the words A through D are shown with no errors.

In accordance with the matrix of FIG. 4a, the encoder circuit 10-30 of FIG. 3a generates values for check code bits C0 through C5 by summing the data and parity bits in each word as designated by the binary ONE bits in the matrix of FIG. 4a. The values of the check code bits produced by encoder circuit 10-30 are as indicated.

As illustrated by FIG. 5, the data and check code bits of each word are written into memory subsystem 10-1 within the time interval indicated. It will be appreciated that from the point of view of memory subsystem operation, there is no recognition of any error present in the stored data until it is read out during a read cycle of operation.

Assuming that a device requests read out of the same four data words, it is seen from FIG. 4e that the four words A through D read out from memory 10-40 appear inverted. When they are applied to decoder 10-50, this results in the generation of syndrome bit signal S0 through S5 which are all binary ZEROS indicating the presence of no errors (see FIG. 4e).

Referring to FIG. 3c, it will be noted that when the syndrome bits S0 through S5 are all ZEROS, signals S0E and S1E are binary ZEROS while signals S2E through S5E are binary ONES. This causes the output signals EC0 through EDB to remain binary ONES which simply results in the complementing of each of the signals RD0 through RDB by the exclusive OR circuits of block 10-64. The signals S00 through S5E condition the error generation circuits 10-68 which cause signals REDD and YELL to be binary ZEROS (i.e., signal RE is forced to a binary ZERO while the E terminal of circuit 10-684 is forced to a binary ONE).

It can be seen from the above how the arrangement of the present invention generates the appropriate check code and syndrome signals for several different coded words containing no errors.

Now, it will be assumed that bit 0 of one of the bytes of word A when presented to memory subsystem 10-1 by a device was in error and therefore contained bad parity. Accordingly, this results in a binary ONE being included in column BPS of FIG. 4d. As seen from FIG. 4d, this causes check code bits C0 and C1 to be binary ZEROS while check code bits C2–C5 remain binary ONES.

When a device requests for read out of word A during a subsequent read memory cycle of operation, this results in decoder circuit 12-50 forcing syndrome bits S0 and S1 to binary ONES. Syndrome bits S2–S5 remain binary ZEROS. This causes decoder circuits 10-510 and 10-512 of FIG. 3b to force signals S0E and S1E to binary ONES. The signals S20 through S50 remain binary ZEROS. Accordingly, the even number of ONES in the syndrome bits causes circuit 10-684 of FIG. 3c to force its even output terminal to a binary ONE and circuit 10-680 to force signal RE to a binary ONE which results in AND gate 10-682 forcing signal REDD to a binary ONE. This signals an uncorrectable error condition to the system.

It will be appreciated that where there is a single bit error condition, this causes the syndrome bits to contain an odd number of binary ONES. For example, it is assumed that word A is written correctly into memory but when read out, it contains an error in bit 0.

The decoder circuit 10-50 forces syndrome bits S0, S3 and S4 to binary ONES when bit 0 is a binary ZERO. That is, signal S0E is forced to a binary ONE, signal S10 is forced to a binary ONE, signal S20 is forced to a binary ZERO, signals S30 and S40 are forced to binary ONES and signal S50 is forced to a binary ZERO. This results in a code of 001 being applied to the enable input terminals of each decoder circuit and a code of 011 being applied to the select input terminals of each decoder circuit. This enables the decoder circuit 10-620 and causes it to force signal ED0 to a binary ZERO. This in turn causes the exclusive OR circuit 10-640 to force signal CRD0 to a binary ZERO. The odd number of binary ONES causes the circuit 10-684 to force signal YELL to a binary ONE indicating the occurrence of a corrected single error condition.

In accordance with the present invention, the occurrence of a partial write error also will be detected as an uncorrectable error condition. For example, it is assumed that during the read portion of a byte write operation (see FIG. 5), the error generation circuits 10-68 detect the presence of a double error in word A. This results in signal REDD being forced to a binary ONE. During the write cycle of the byte write operation (see FIG. 5), the encoder circuit 10-30 causes check code bits C4 and C5 to be forced to binary ZEROS and the new and odd data bytes selected by circuits 10-20 and 10-26 are written into memory 10-40.

When a word A is read out during a subsequent read cycle of operation, the decoder circuit 10-50 forces syndrome bits S4 and S5 to binary ONES. The error generation circuits 10-68 are conditioned by the even number of binary ONES to force its even output terminal to a binary ONE. This results in signal REDD in being forced to a binary ONE signalling the uncorrectable error condition to the system of FIG. 1.

It will be appreciated that a double error in a word also causes the circuits 10-68 to force signal REDD to a binary ONE indicating an uncorrectable error condition. For example, it is assumed that bits 0 and 1 of word A are both binary ZEROS when read out during a read cycle of operation. This causes the decoder circuit 10-50 to force syndrome bits S4 and S5 to binary ONES. This in turn causes the circuit 10-684 to force its even output terminal to a binary ONE which results in signal REDD being forced to a binary ONE.

From the foregoing, it is seen how the arrangement of the present invention is able to detect and signal the presence of a variety of uncorrectable error conditions to a system while enabling the system to operate at maximum speed and efficiency. Moreover, the present invention provides the foregoing without having to increase the number of check code bits required to be stored. Also, the arrangement of the present invention minimizes the amount of error detection and correction circuits thereby resulting in increased system reliability.

It will be appreciated by those skilled in the art that many changes may be made to the preferred embodiment of the present invention. For example, this could include changes in the number of bits included in a word, the type of bus system and type of circuits.

While in accordance with the provisions and statutes there has been illustrated and described the best form of the invention known, certain changes may be made to the system described without departing from the spirit of the in invention as set forth in the appended claims and, in some cases, certain features of the invention may be used to advantage without a corresponding use of other features.

What is claimed is:

1. A data processing system including a plurality of data handling devices, each connected in common to receive and transfer groups of signals over a bus network, said system further including a memory subsystem comprising:

a memory for storing said groups of signals;

input means coupled to said bus for receiving said groups of signals from any one of said data handling devices for storage in said memory during a memory cycle of operation, each said group of signals including a plurality of unchecked data bit signals and at least one parity bit signal for indicating the validity of said data bit signals;

encoder means coupled to said input means and to said memory, said encoder means for generating a group of check code bits derived from a group of said unchecked data bit signals and said one parity bit signal, said encoder means forcing a number of said check code bit signals to predetermined states when said one parity bit signal designates that said unchecked data bit signals are in error;

means connected to said encoder means and to said input means for applying said unchecked data bit signals and group of check code bit signals to said memory for said storage during said memory cycle of operation; and, decoder means coupled to said memory, said decoder means for generating a plurality of syndrome signals for locating an error in said data bit signals, the location of said error being established by said unchecked data bit signals and said check code bit signals read out from said memory during a subsequent cycle of operation, said plurality of syndrome signals having a first predetermined characteristic for signaling when said group of unchecked data signals from any one of said data handling devices have incorrect parity when written into said memory enabling the storage of said signals from said bus to proceed without decreasing the operating speed of said system.

2. The system of claim 1 wherein each said group of signals include a plurality of bytes and a plurality of parity bit signals, each said parity bit signals being coded to specify odd parity for a different one of said plurality of bytes.

3. The system of claim 1 wherein said subsystem further includes logic means for correcting an error in said group of data bit signals, said logic means being connected to said memory for receiving said data bit signal read out from said memory and said plurality of syndrome signals for correcting said error in accordance with the states of said plurality of said syndrome signals.

4. The system of claim 1 wherein said first predetermined characteristic corresponds to said plurality of syndrome signals containing an even number of binary ONES indicative of an uncorrectable error condition.

5. The system of claim 4 wherein said subsystem further includes:
error indicator means connected to said decoder means for receiving selected states of said plurality of syndrome signals, said indicator means being operative in response to detecting when said plurality of syndrome signals contains an even number and odd number of binary ONES to generate a first output signal indicating the presence of said uncorrectable error condition and a second output signal indicating the presence of a single bit error condition.

6. The system of claim 5 wherein said decoder means includes a plurality of parity circuits corresponding in number to the number of said plurality of syndrome signals, each of said plurality of parity circuits being connected to receive a different combination of said data bit signals and check code signals, each said parity circuit including a pair of output terminals for indicating complementary states of a predetermined one of said plurality of syndrome signals and said error indicator means being selectively connected to one of said pair of output terminals of each said parity circuits for receiving signals corresponding to the normal states of said plurality of syndrome signals.

7. The subsystem of claim 6 wherein said number of said parity circuits is six and said pairs of terminals are designated S00, S0E through S50, S5E and wherein said error indicator means include:
logic gating means having a plurality of input terminals and an output terminal, said plurality of input terminals being connected to receive signals S00, S10, S2E through S5E;
parity circuit means having a plurality of input terminals and an even and odd output terminal, said plurality of input terminals being connected to receive said signals S00, S10, S2E through S5E; and,
output gating means connected to said output terminal of said logic gating means and to said even output terminal, said output gating means being conditioned by said logic gating means in response to an error condition to generate said first output signal when said parity circuit means forces said even output terminal to a binary ONE for indicating that said syndrome signals contain an even number of binary ONES and said error indicator circuit means generating said second output signal when said parity circuit means forces said odd output terminal to a binary ONE indicating that said syndrome signals contain an odd number of binary ONES.

8. The system of claim 1 wherein said encoder means includes:
a plurality of parity circuits corresponding in number to the number of check code bits of said group, each of said plurality of parity circuits being connected to receive a different combination of said unchecked data bit signals, each said parity circuit including a pair of output terminals for indicating complementary states of a predetermined one of said plurality of check code bits and wherein said means include circuit means connected to a predetermined one of said pair of output terminals of each said parity circuit for applying a predetermined state of each of said check code bits to said memory.

9. The system of claim 8 wherein each said pair of output terminals include an even output terminal and an odd output terminal and said circuit means being connected to said even and said odd output terminals of said plurality of parity circuits for providing check code bits to said memory which do not contain all binary ONES and all binary ZEROS for predetermined patterns of said data bit signals enabling detection of catastrophic failures in said memory.

10. The system of claim 9 wherein said predetermined patterns of said data bit signals include all ZEROS and all ONES.

11. The system of claim 5 wherein said encoder means further includes logic circuit means connected to receive said first output signal and a signal indicating when said memory is performing a partial write operation, said logic circuit means including means conditioned by said output signal generated by said error indicator means during a read portion of said partial write operation to force said number of said check code bit signals to predetermined states for designating the presence of an uncorrectable error in said data bit signals and check bit signals being written into said memory during a write portion of said partial write operation.

12. The system of claim 11 wherein said decoder means being conditioned by said data bit signals and check code bit signals written into said memory during said write portion of said partial write operation when read out during said subsequent cycle of operation to generate syndrome signals having said first characteristic.

13. The system of claim 12 wherein said group of check code bit signals include an even number of bits and wherein said number of said check code bit signals forced to said predetermined states is an even number.

14. The system of claim 13 wherein said even number of bits is six and wherein said even number of said check code bit signals is two.

15. A method of detecting and correcting errors in groups of signals received from any one of a plurality of data handling devices connected to a bus network for storage in a memory subsystem containing encoder and decoder circuits, each of said groups of signals including a plurality of data bit signals and at least one parity bit signal for indicating the validity of said plurality of data bit signals, said method comprising the steps of:

receiving a group of signals to be stored in said memory from one of said devices for writing into said memory during a memory cycle of operation;

generating a group of check code bit signals by said encoder circuits from said plurality of data bit signals and said one parity bit signal of said group and forcing a number of said check code bit signals to a predetermined state when said one parity bit signal indicates that said data bit signals received from said one device are in error;

storing only said data bit signals and said check bit signals of said group in said memory during said memory cycle of operation; and, generating a plurality of syndrome signals by said decoder circuits for locating an error in said data bit signals of said group of signals, the location of said error being established by said data bit signals and said check code bit signals read out from said memory during a succeeding memory cycle of operation and forcing said plurality of syndrome signals to have a first predetermined characteristic for signaling when said group of data bit signals had incorrect parity when written into said memory enabling detection of incorrect signals without decreasing the operating speed of said data handling devices.

16. The method of claim 15 wherein said first predetermined characteristic is generated by said decoder circuits forcing said plurality of syndrome signals to contain an even number of binary ONES indicative of an uncorrectable error condition.

17. The method of claim 16 wherein said decoder circuits produce said even number of binary ONES by forcing an even number of syndrome signals to binary ONES.

18. The method of claim 15 wherein said method further includes the step of:

generating said plurality of syndrome signals by said decoder circuits to have a second predetermined characteristic for signaling when said group of data bit signals contain a single bit error condition.

19. The method of claim 18 wherein said second predetermined characteristic is generated by said decoder circuits forcing said plurality of syndrome signals to contain an odd number of binary ONES indicative of a single error condition.

20. The method of claim 19 wherein said memory subsystem further includes error indicator circuits and method further includes the steps of:

applying signals representative of the states of said plurality of syndrome signals to said error indicator circuits;

generating a first output signal by said error indicator circuits indicating the presence of said uncorrectable error condition upon detecting said even number of binary ONES; and, generating a second output signal by said error indicator circuits indicating the presence of said single error condition upon detecting said odd number of binary ONES.

21. The method of claim 20 wherein said method further includes the steps of:

receiving a signal indicating when said memory is performing a partial write operation;

applying said signal and said first output signal to said encoder circuits;

forcing said number of said check code bit signals to said predetermined state by said encoder circuits when said first output signal is generated by said error indicator means during a read portion of said partial write operation; and, writing said check code bit signals and said data bit signals including a number of new data bit signals received from said bus and a portion of the data bit signals read out during said read portion into said memory during a write portion of said partial write operation enabling detection of uncorrectable error conditions during a subsequent memory cycle of operation.

22. In a data processing system including a memory including a plurality of word locations, an encoder, a decoder and error indicator circuits, a plurality of peripheral devices, a central processing unit, each connected to transmit and receive words over a bus network to and from said memory, each of said words including a number of bytes and a corresponding number of parity bits, a method of detecting errors during the performance of a partial write operation wherein said partial write operation involves replacement of one of said number of said bytes of a word read out from one of said plurality of addressable locations with a byte applied to said bus network, said method comprising the steps of:

receiving a byte write signal from said bus network indicating when said memory is to perform said partial write operation;

generating an output error signal by said error indicator circuits in response to a plurality of syndrome signals from said decoder indicating the presence of an uncorrectable error in one of said words read out from one of said memory locations during a read portion of said partial write operation;

applying said output error signal and said byte write signal to said encoder;

generating by said encoder a group of check code bits derived from a first byte applied to said bus and a second byte read out from said one of said memory locations during said read portion;

forcing by said encoder a number of said check code bit signals to a predetermined state in response to said output error signal; and, writing said check code bit signals and said first and second bytes into one of said memory locations during a write portion of said partial write operation for enabling detection of uncorrectable error conditions during a subsequent memory cycle of operation by said decoder forcing said syndrome signals to have a first predetermined characteristic.

23. The method of claim 22 wherein said first predetermined characteristic is generated by said decoder forcing said plurality of syndrome signals to contain an even number of binary ONES indicative of said uncorrectable error condition.

24. The method of claim 23 wherein said decoder produces said even number of binary ONES by forcing an even number of syndrome signals to binary ONES.

25. A data processing system including at least one memory unit central processing unit and a plurality of peripheral devices each being connected to a bus for transmitting and receiving words to and from said memory unit each of said words including a number of bytes and a corresponding number of parity bits for indicating the validity of one of said bytes associated therewith, said memory unit comprising:

an addressable memory having a plurality of word locations;

input means connected to said bus for receiving any one of said words from any one of said devices and said central processing unit for storage in one of said word locations during a memory cycle of operation;

an encoder connected to said input means, said encoder being operative to generate a group of check code bit signals from said any one of said words immediately upon being received from said bus, said encoder forcing a number of said check code bit signals to a predetermined state when conditioned by one of said number of parity bits which designates that a corresponding byte is in error;

means connected to said encoder and to said input means for applying said number of bytes of said nay one of said words and said group of check code bit signals to said memory for writing into one of said memory locations during said memory cycle of operation; and, a decoder connected to said memory, said decoder generating a plurality of syndrome signals for locating errors in said number of bytes of said one of said memory location when read out during a subsequent memory cycle of operation, said decoder being conditioned by said number of said check code bits being in said predetermined state to cause said plurality of syndrome signals to have a first predetermined characteristic for signaling that one of said bytes had bad parity when written into said memory enabling the storage of each of said words to proceed without decreasing the operation speed of said system.

26. The system of claim 25 wherein said first predetermined characteristic corresponds to said plurality of syndrome signals containing an even number of binary ONES indicative of an uncorrectable error condition.

27. The system of claim 26 wherein said decoder produces said even number of binary ONES by forcing an even number of syndrome signals to binary ONES.

* * * * *